United States Patent
Abdulkhair et al.

(10) Patent No.: US 12,454,466 B1
(45) Date of Patent: Oct. 28, 2025

(54) AMORPHOUS SILICA/CUBIC $Co_3O_4$/CUBIC NiO/C NANOCOMPOSITE AND METHOD OF PREPARATION THEREOF

(71) Applicant: IMAM MOHAMMAD IBN SAUD ISLAMIC UNIVERSITY, Riyadh (SA)

(72) Inventors: Babiker Yagoub Elhadi Abdulkhair, Riyadh (SA); Ehab Abdelhamed Abdelrahman Ahmed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/235,451

(22) Filed: Jun. 11, 2025

(51) Int. Cl.
- C01G 53/04 (2025.01)
- B82Y 30/00 (2011.01)

(52) U.S. Cl.
CPC ............ C01G 53/04 (2013.01); B82Y 30/00 (2013.01); *C01P 2002/02* (2013.01); *C01P 2002/72* (2013.01); *C01P 2002/85* (2013.01); *C01P 2004/03* (2013.01); *C01P 2004/45* (2013.01); *C01P 2004/61* (2013.01); *C01P 2004/62* (2013.01); *C01P 2004/82* (2013.01)

(58) Field of Classification Search
CPC ......... C01G 54/04; C01B 33/12; B82Y 30/00; C01P 2002/02; C01P 2002/72; C01P 2002/85; C01P 2004/03; C01P 2004/45; C01P 2004/61; C01P 2004/62; C01P 2004/82
See application file for complete search history.

(56) References Cited

FOREIGN PATENT DOCUMENTS

| CN | 103331162 B | 3/2015 |
|---|---|---|
| CN | 104525203 B | 6/2016 |

(Continued)

OTHER PUBLICATIONS

Rahdar, Somayeh, et al. "Synthesis and physical characterization of nickel oxide nanoparticles and its application study in the removal of ciprofloxacin from contaminated water by adsorption: equilibrium and kinetic studies." Desalination and water treatment 141 (2019): 386-393.*

(Continued)

*Primary Examiner* — Richard M Rump
(74) *Attorney, Agent, or Firm* — Oblon, McClelland, Maier &Neustadt, L.L.P.

(57) ABSTRACT

An amorphous silica/cubic $Co_3O_4$/cubic NiO/C nanocomposite material includes an amorphous Si phase, a cubic $Co_3O_4$ phase and a cubic NiO phase. Further, the amorphous silica/cubic $Co_3O_4$/cubic NiO/C nanocomposite material has a granular morphology with an average grain size in a range from 0.5 to 2.5 μm, where the granular morphology includes nanoscale particles aggregated into the granular morphology. Still further, the nanoscale particles have an average particle diameter in a range from 30 to 90 nm. Furthermore, the amorphous silica/cubic $Co_3O_4$/cubic NiO/C nanocomposite material has an adsorption capacity for ciprofloxacin of greater than or equal to 170 mg/g.

20 Claims, 9 Drawing Sheets

(56) References Cited

FOREIGN PATENT DOCUMENTS

| CN | 106083527 A | * 11/2016 | ............. B01J 29/85 |
|---|---|---|---|
| CN | 109257915 B | 10/2020 | |
| CN | 113019372 B | 3/2023 | |

OTHER PUBLICATIONS

Golmohammadi, Morteza, Hanieh Hanafi-Bojd, and Mehdi Shiva. "Photocatalytic degradation of ciprofloxacin antibiotic in water by biosynthesized silica supported silver nanoparticles." Ceramics International 49.5 (2023): 7717-7726.*

Bronzato, Julia D., et al. "Degradation of ciprofloxacin by green cobalt oxide quantum dots." Applied Surface Science 609 (2023): 155193.*

T.B. Ivetić, et al., "Structure and magnetic properties of Co3O4/SiO2 nanocomposite synthesized using combustion assisted sol-gel method", Ceramics International, vol. 42, Issue 16, Aug. 27, 2016, pp. 18312-18317, Excerpts only, 4 pages.

* cited by examiner

AMORPHOUS SILICA/CUBIC $Co_3O_4$/CUBIC NiO/C NANOCOMPOSITE AND METHOD OF PREPARATION THEREOF

BACKGROUND

Technical Field

The present disclosure is directed to a nanocomposite, more particularly, towards a multifunctional nanocomposite made of amorphous silica/cubic $Co_3O_4$/cubic NiO/C material and method of preparation thereof.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

A nanocomposite is a multiphase solid material where one of the phases has one, two or three dimensions of less than 1000 nanometers (nm) or structures having nano-scale repeat distances between the different phases that make up the material.

Traditional approaches to nanocomposite synthesis often struggle to achieve the precise combination of nanoscale features, uniform morphology, and multifunctionality that is beneficial for advanced applications. These conventional methods may lead to issues such as inconsistencies in particle size, poor distribution of components, and limited control over the nanoscale interactions between materials. As a result, the final nanocomposites may not exhibit the desired performance characteristics, such as enhanced strength, conductivity, or catalytic activity. Additionally, the complexity of achieving uniform morphology across large-scale production and enabling the integration of diverse functionalities (such as electrical, optical, and mechanical properties) often requires intricate processing steps, making traditional methods less efficient or scalable for industrial applications. Newer, more innovative approaches are therefore needed to address these challenges and enable the creation of nanocomposites with enhanced, tailored properties.

Traditional methods like melt blending, ball milling, chemical vapor deposition (CVD), and solution casting often fall short in achieving nanocomposites with precise nanoscale features, uniform morphology, and multifunctionality. For example, melt blending struggles with uniform nanoparticle distribution in polymers. Ball milling may cause agglomeration and contamination, and CVD may fail to produce uniform coatings, including on complex substrates. Similarly, solution casting often leads to uneven nanoparticle distribution, affecting the final properties of material. These challenges make it difficult to meet the demands of advanced applications requiring high performance and tailored functionalities including on complex substrates.

Existing technologies predominantly focus on the preparation of individual oxide nanomaterials such as silica, cobalt oxide, and nickel oxide, often utilizing methods that lack efficiency, scalability, or environmental consideration. Additionally, traditional approaches have limited success in combining multiple functional components into a single composite while maintaining nanoscale control, structural uniformity, and desirable properties. Previous research articles primarily highlight methods for synthesizing cobalt oxide and nickel oxide nanomaterials independently, often using precipitation, hydrothermal, or solid-state methods. Similarly, research addressing silica-based composites tends to rely on either template-based methods or techniques that involve harsh conditions and toxic precursors. While such approaches achieve moderate success, they fail to deliver multifunctional composites with enhanced synergistic properties. Moreover, such techniques generally involve energy-intensive processes, prolonged reaction times, or generate substantial chemical waste.

Each of the aforementioned nanomaterials suffers from one or more drawbacks hindering their adoption. Accordingly, one objective of the present disclosure to provide a material composition that may circumvent problems such as structural non-uniformity, inconsistent chemical properties, lack of homogeneous distribution of nanoparticles, lack of synthesis of multifunctional composites, and high cost known in the art.

SUMMARY

In an exemplary embodiment, an amorphous silica/cubic $Co_3O_4$/cubic NiO/C nanocomposite material is described. The nanocomposite material includes an amorphous silicon (Si) phase, a cubic [cobalt (III) oxide] ($Co_3O_4$ phase) and a cubic nickel oxide (NiO) phase. Further, the amorphous silica/cubic $Co_3O_4$/cubic NiO/C nanocomposite material has a granular morphology with an average grain size in a range from 0.5 micrometer (μm) to 2.5 μm, where the granular morphology includes nanoscale particles aggregated into the granular morphology. Still further, the nanoscale particles have an average particle diameter in a range from 30 nanometer (nm) to 90 nm. Furthermore, the amorphous silica/cubic $Co_3O_4$/cubic NiO/C nanocomposite material has an adsorption capacity for ciprofloxacin of greater than or equal to 170 milligram per gram (mg/g).

In some embodiments, the amorphous silica/cubic $Co_3O_4$/cubic NiO/C nanocomposite material has an average grain size in a range from 1 μm to 2 μm.

In some embodiments, the amorphous silica/cubic $Co_3O_4$/cubic NiO/C nanocomposite material has an average grain size in a range from 1.3 μm to 1.6 μm.

In some embodiments, the nanoscale particles have an average particle diameter in a range from 40 nm to 80 nm.

In some embodiments, the nanoscale particles have an average particle diameter in a range from 55 nm to 65 nm.

In some embodiments, the amorphous silica/cubic $Co_3O_4$/cubic NiO/C nanocomposite material has an oxygen content in a range from 40 atomic % (at. %) to 70 at. %, a silicon content in a range from 15 at. % to 35 at. %, a cobalt content in a range from 0.25 at. % to 15 at. %, a nickel content in a range from 0.25 at. % to 10 at. %, and a carbon content in a range from 4 at. % to 25 at. %, where at. % is based on the total number of atoms in the amorphous silica/cubic $Co_3O_4$/cubic NiO/C nanocomposite material.

In some embodiments, the amorphous silica/cubic $Co_3O_4$/cubic NiO/C nanocomposite material has an oxygen content in a range from 45 at. % to 65 at. %, a silicon content in a range from 20 at. % to 30 at. %, a cobalt content in a range from 0.5 at. % to 10 at. %, a nickel content in a range from 0.5 at. % to 5 at. %, and a carbon content in a range from 8 at. % to 20 at. %, where at. % is based on the total number of atoms in the amorphous silica/cubic $Co_3O_4$/cubic NiO/C nanocomposite material.

In some embodiments, the amorphous silica/cubic $Co_3O_4$/cubic NiO/C nanocomposite material has an oxygen content in a range from 50 at. % to 60 at. %, a silicon content in a range from 22 at. % to 26 at. %, a cobalt content in a range from 3 at. % to 7.5 at. %, a nickel content in a range from 1 at. % to 3.5 at. %, and a carbon content in a range from 10 at. % to 17 at. %, where at. % is based on the total number of atoms in the amorphous silica/cubic $Co_3O_4$/cubic NiO/C nanocomposite material.

In some embodiments, the amorphous silica/cubic $Co_3O_4$/cubic NiO/C nanocomposite material has an average crystallite size in a range from 50 nm to 70 nm.

In some embodiments, the amorphous silica/cubic $Co_3O_4$/cubic NiO/C nanocomposite material has an average crystallite size in a range from 52 nm to 65 nm.

In some embodiments, the amorphous silica/cubic $Co_3O_4$/cubic NiO/C nanocomposite material has an average crystallite size in a range from 55 nm to 60 nm.

In another exemplary embodiment, a method of producing the amorphous silica/cubic $Co_3O_4$/cubic NiO/C nanocomposite material is described. The method includes adding ammonium hydroxide ($NH_4OH$) dropwise to a solution including [nickel (II) nitrate hexahydrate] ($Ni(NO_3)_2 \cdot 6H_2O$), [cobalt (II) nitrate hexahydrate] ($Co(NO_3)_2 \cdot 6H_2O$), and vinyltrimethoxysilane, forming a reaction mixture. Further, the method includes stirring the reaction mixture for 1 hour, forming a gel-like precipitate, filtering and washing the gel-like precipitate with distilled water to form a washed precipitate. Still further, the method includes drying the washed precipitate at 100° C. to form a dried precipitate. Furthermore, the method includes calcining the dried precipitate at a temperature in a range from 600° C. to 800° C. for 2 hours to 4 hours to form the amorphous silica/cubic $Co_3O_4$/cubic NiO/C nanocomposite material.

In some embodiments, the concentration of ammonium hydroxide ($NH_4OH$) in the reaction mixture is in a range from 50 milliliter per liter (ml/L) to 70 ml/L.

In some embodiments, the concentration of $Ni(NO_3)_2 \cdot 6H_2O$ in the reaction mixture is in a range from 80 gram per liter (g/L) to 100 g/L.

In some embodiments, the concentration of $Co(NO_3)_2 \cdot 6H_2O$ in the reaction mixture is in a range from 80 g/L to 100 g/L.

In some embodiments, the concentration of vinyltrimethoxysilane in the reaction mixture is in a range from 300 ml/L to 500 ml/L.

In some embodiments, the dried precipitate is calcined at 650° C. to 750° C.

In some embodiments, the dried precipitate is calcined at 700° C.

In some embodiments, the dried precipitate is calcined for 2 hours to 4 hours.

In some embodiments, the dried precipitate is calcined for 3 hours.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
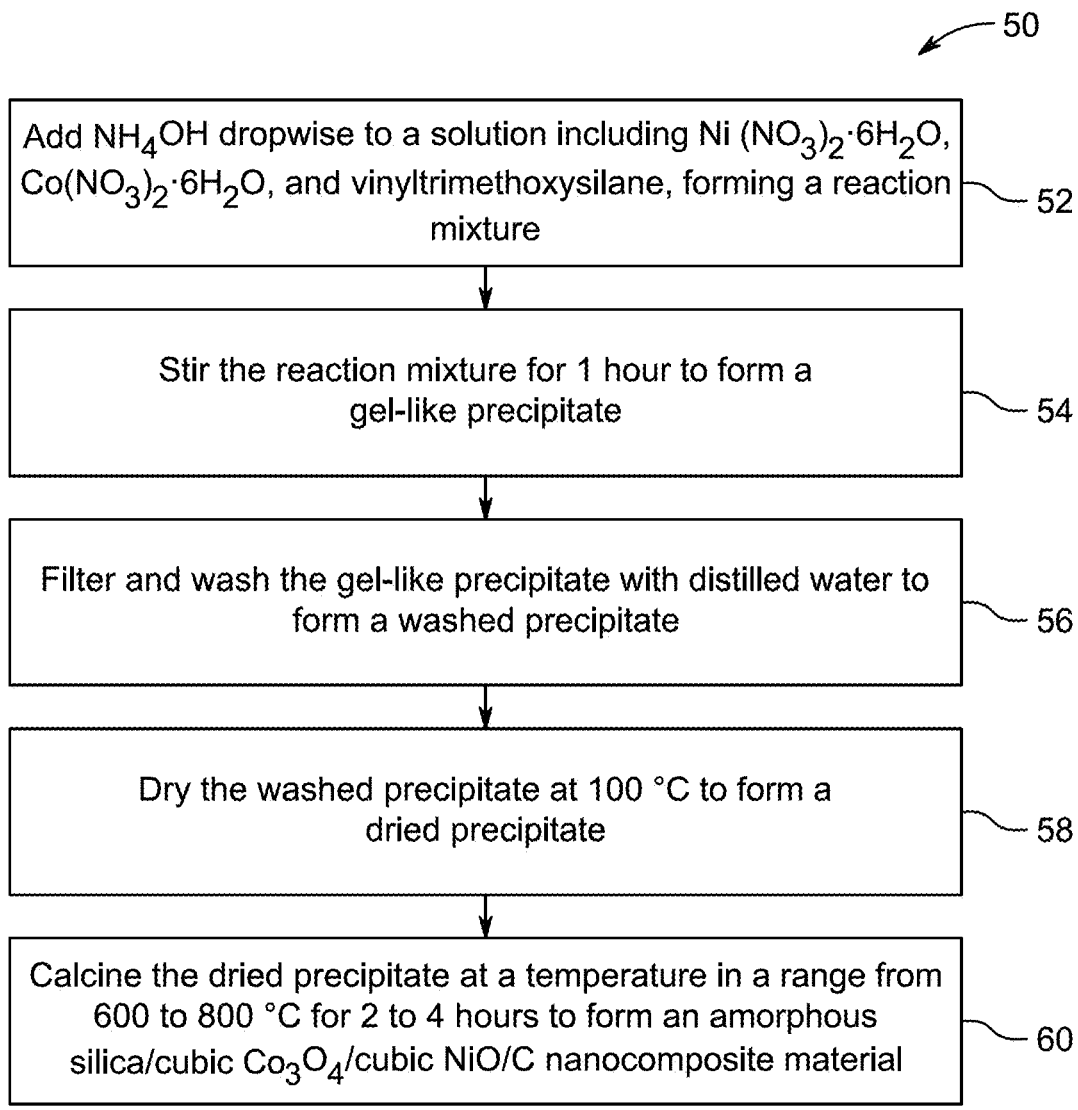
FIG. 1A is a schematic flowchart of a method of producing an amorphous silica/cubic $Co_3O_4$/cubic NiO/C nanocomposite material (nanocomposite material), according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 500 nm within the scope of the present disclosure.

As used herein, the term 'nanocomposite' refers to a composite material that has at least one component with a grain size measured in nanometers.

As used herein, the term 'nanohybrid composite' refers to a material that combines nanomaterials (such as nanoparticles, nanotubes, or nanofibers) with another material, typically a polymer, metal, or ceramic, to form a composite structure. The nanomaterials are typically incorporated at the nanoscale level to enhance the properties of the base material, such as improving strength, conductivity, or flexibility, while maintaining the advantages of both components. The resulting nanohybrid composite exhibits unique properties that are enhanced compared to the individual materials alone.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3/g$) and is a parameter in characterizing the porous structure of materials, such as adsorbents or catalysts.

As used herein, the term 'average particle size' refers to the mean diameter of nanoparticles in a sample, typically calculated from measurements obtained using techniques such as scanning electron microscopy (SEM) or transmission electron microscopy (TEM), representing the typical size of the particles in the distribution.

As used herein, the term 'average crystallite size' refers to the mean size of crystalline regions in a material, typically determined through X-ray diffraction (XRD) analysis, and represents the size of the individual crystal domains within the sample, excluding any amorphous material.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

An aspect of the present disclosure is directed to an amorphous silica/cubic $Co_3O_4$/cubic NiO/C nanocomposite material fabricated using a facile and environmentally friendly sol-gel approach. The nanocomposite material fabricated by the method of present disclosure yields a uniform and high-crystallinity material with enhanced structural and compositional properties.

An amorphous silica/cubic $Co_3O_4$/cubic NiO/C nanocomposite material is described. The nanocomposite material includes an amorphous Si phase, a cubic $Co_3O_4$ phase, and a cubic NiO phase. In some embodiments, the nanocomposite material may include crystalline phases, but is not limited to quartz, calcite, hematite, magnetite, goethite, dolomite, albite, anorthite, pyrite, fluorite, halite, barite, apatite, rutile, and zircon. In some embodiments, the nanocomposite material has an average crystallite size in a range from 40 to 80 nm, preferably 50 to 70 nm, preferably 52 to 65 nm, preferably 55 to 60 nm, preferably 57 to 60 nm. In a preferred embodiment, the nanocomposite has an average crystallite size of 57.30 nm.

In some embodiments, the nanocomposite material is porous. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm. The term 'mesoporous' means the pores of the nanocomposite have an average pore width of 2-50 nm. The term 'macroporous' means the pores of nanocomposite have an average pore width larger than 50 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT).

In some embodiments, the nanocomposite material comprises sheet morphologies, preferably nanosheets, although other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures thereof are also possible. In a preferred embodiment, the nanocomposite material has a granular morphology including nanoscale particles aggregated into the granular morphology.

In some embodiments, the nanocomposite material has a granular morphology with an average grain size in a range from 0.1 to 5 µm, preferably 0.5 to 2.5 µm, preferably 1 to 2 µm, preferably 1.3 to 1.6 µm, preferably 1.4 to 1.6 µm, preferably 1.5 to 1.6 µm. In a preferred embodiment, the nanocomposite material has a granular morphology with an average grain size of 1.46 µm. In some embodiments, the nanoscale particles of nanocomposite material have an average particle diameter in a range from 20 to 100 nm, preferably 30 to 90 nm, preferably 40 to 80 nm, preferably 60 to 80 nm, preferably 55 to 65 nm, preferably 70 to 80 nm. In a preferred embodiment, the nanocomposite material has an average particle diameter of 59.04 nm.

In some embodiments, the nanocomposite material has an oxygen content in a range from 30 to 80 atomic % (at. %), preferably 40 to 70 at. %, preferably 45 to 65 at. %, preferably 50 to 60 at. %, preferably 55 to 60 at. %, preferably 45 to 55 at. %, where, at. % is based on the total number of atoms in the nanocomposite material. In a preferred embodiment, the nanocomposite material has an oxygen content of 54.1% where, at. % is based on the total number of atoms in the nanocomposite material.

In some embodiments, the nanocomposite material has a silicon content in a range from 10 to 45 at. %, preferably 15 to 35 at. %, preferably 20 to 30 atomic % (at. %), preferably 22 to 26 atomic % (at. %), preferably 22 to 27 at. %, where, at. % is based on the total number of atoms in the nanocomposite material. In a preferred embodiment, the nanocomposite material has a silicon content of 24.2% where, at. % is based on the total number of atoms in the nanocomposite material.

In some embodiments, the nanocomposite material has a cobalt content in a range from 0.1 to 25 at. %, preferably 0.25 to 15 at. %, preferably 0.5 to 10 atomic % (at. %), preferably 3 to 7.5 atomic % (at. %), preferably 10 to 15 at. %, where, at. % is based on the total number of atoms in the nanocomposite material. In a preferred embodiment, the nanocomposite material has a cobalt content of 5.8% where, at. % is based on the total number of atoms in the nanocomposite material.

In some embodiments, the nanocomposite material has nickel content in a range from 0.1 to 20 at. %, preferably 0.25 to 10 at. %, preferably 0.5 to 5 atomic % (at. %), preferably 1 to 3.5 atomic % (at. %), preferably 6 to 9 at. %, where, at. % is based on the total number of atoms in the nanocomposite material. In a preferred embodiment, the nanocomposite material has a nickel content of 2.3% where, at. % is based on the total number of atoms in the nanocomposite material.

In some embodiments, the nanocomposite material has a carbon content in a range from 1 to 35 at. %, preferably 4 to 25 at. %, preferably 8 to 20 atomic % (at. %), preferably 10 to 17 atomic % (at. %), preferably 12 to 18 at. %, where, at. % is based on the total number of atoms in the nanocomposite material. In a preferred embodiment, the nanocomposite material has a carbon content of 13.6% where, at. % is based on the total number of atoms in the nanocomposite material.

In one or more embodiments, the nanocomposite material has an amorphous silica content in a range from 10 to 40 wt. %, a cubic $Co_3O_4$ content in a range from 10 to 40 wt. %, a cubic NiO content in a range from 10 to 40 wt. %, and a C content in a range from 2 to 25 wt. %, based on the total weight of the nanocomposite material.

In some embodiments, the nanocomposite material has an adsorption capacity for ciprofloxacin of greater than or equal to 140 mg/g, preferably greater than or equal to 170 mg/g, preferably greater than or equal to 175 mg/g, preferably greater than or equal to 180 mg/g, preferably greater than or equal to 185 mg/g, preferably greater than or equal to 190 mg/g, preferably greater than or equal to 195 mg/g, preferably greater than or equal to 200 mg/g. In a preferred embodiment, the amorphous nanocomposite material has an adsorption capacity for ciprofloxacin of 158.11 mg/g.

FIG. 1A illustrates a schematic flow chart of a method 50 of preparing the amorphous silica/cubic $Co_3O_4$/cubic NiO/C nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes adding $NH_4OH$ dropwise to a solution comprising $Ni(NO_3)_2 \cdot 6H_2O$, $Co(NO_3)_2 \cdot 6H_2O$, and vinyltrimethoxysilane, forming a reaction mixture. In some embodiments, the $NH_4OH$ acts as a base, although other bases such as sodium hydroxide, potassium hydroxide, calcium hydroxide, lithium hydroxide, magnesium hydroxide, barium hydroxide, strontium hydroxide, sodium carbonate, potassium carbonate, calcium carbonate, sodium bicarbonate, potassium bicarbonate, ammonium carbonate, sodium acetate, potassium acetate, calcium acetate, sodium metasilicate, potassium metasilicate, ammonium carbonate, sodium phosphate, potassium phosphate, calcium phosphate, magnesium phosphate, sodium hydroxide solution, potassium hydroxide solution, sodium sulfate, potassium sulfate, ammonium sulfate, sodium nitrate, potassium nitrate, and sodium borate may also be used. In some embodiments, the concentration of $NH_4OH$ in the reaction mixture may range from 40 to 80 ml/L, preferably 50 to 70 ml/L, preferably 55 to 70 ml/L, preferably 60 to 70 ml/L, preferably 65 to 70 ml/L. In a preferred embodiment, the concentration of $NH_4OH$ is 60 ml/L.

In some embodiments, the $Ni(NO_3)_2 \cdot 6H_2O$ is used as a nickel salt, although other nickel salts such as nickel chloride, nickel sulfate, nickel carbonate, nickel acetate, nickel oxalate, nickel hydroxide, nickel phosphate, nickel citrate, nickel tartrate, nickel formate, nickel benzoate, nickel iodide, nickel bromide, nickel fluoride, nickel perchlorate, nickel chromate, nickel molybdate, nickel tungstate, nickel tellurate, nickel vanadate, nickel citrate tribasic, nickel succinate, nickel glutarate, nickel adipate, nickel stearate, nickel laurate, nickel palmitate, nickel tetraborate, nickel selenate, and/or mixtures thereof can also be used. In some embodiments, the concentration of $Ni(NO_3)_2 \cdot 6H_2O$ in the reaction mixture may range from 50 to 130 g/L, preferably 80 to 100 g/L, preferably 85 to 100 g/L, preferably 90 to 100 g/L, preferably 95 to 100 g/L. In a preferred embodiment, the concentration of $Ni(NO_3)_2 \cdot 6H_2O$ is 90 g/L.

In some embodiments, $Co(NO_3)_2 \cdot 6H_2O$ is used as a cobalt salt, although other salts such as cobalt chloride, cobalt sulfate, cobalt carbonate, cobalt acetate, cobalt oxalate, cobalt hydroxide, cobalt phosphate, cobalt citrate, cobalt tartrate, cobalt formate, cobalt benzoate, cobalt iodide, cobalt bromide, cobalt fluoride, cobalt perchlorate, cobalt chromate, cobalt molybdate, cobalt tungstate, cobalt tellurate, cobalt vanadate, cobalt citrate tribasic, cobalt succinate, cobalt glutarate, cobalt adipate, cobalt stearate, cobalt laurate, cobalt palmitate, cobalt tetraborate, cobalt selenate, cobalt arsenate, and/or mixtures thereof may also be used. In some embodiments, the concentration of $Co(NO_3)_2 \cdot 6H_2O$ in the reaction mixture may range from 50 to 130 g/L, preferably 80 to 100 g/L, preferably 85 to 100 g/L, preferably 90 to 100 g/L, preferably 95 to 100 g/L. In a preferred embodiment, the concentration of $Co(NO_3)_2 \cdot 6H_2O$ is 90 g/L.

In some embodiments, vinyltrimethoxysilane is used as the silane coupling agent, although other silane coupling agents such as aminopropyltriethoxysilane, mercaptopropyltrimethoxysilane, propyltrimethoxysilane, octyltrimethoxysilane, methyltriethoxysilane, phenyltrimethoxysilane, butyltrimethoxysilane, chloroalkylsilane, epoxy-functional silane, isocyanatopropyltriethoxysilane, glycidoxypropyltrimethoxysilane, chloropropyltriethoxysilane, N-phenylaminopropyltrimethoxysilane, methacryloxypropyltrimethoxysilane, vinyltriethoxysilane, vinyltriacetoxysilane, trimethoxysilane, vinyltrichlorosilane, cyclohexyltrimethoxysilane, n-octyltriethoxysilane, perfluorooctyltrichlorosilane, tetraethoxysilane, tetraethoxysilane (TEOS), 3-glycidyloxypropyltrimethoxysilane, and/or mixtures thereof may also be used. In some embodiments, the concentration of vinyltrimethoxysilane in the reaction mixture may range from 200 to 600 ml/L, preferably 300 to 500 ml/L, preferably 350 to 500 ml/L, preferably 400 to 500 ml/L, preferably 450 to 500 ml/L. In a preferred embodiment, the concentration of vinyltrimethoxysilane is 400 ml/L.

At step 54, the method 50 includes stirring the reaction mixture for 0.25 to 5 hours, preferably 1 h, forming a gel-like precipitate. In some embodiments, the reaction mixture may be stirred for 0.5 to 2 hours, preferably 1 to 2 hours, preferably 1.5 to 2 hours, preferably 1.75 to 2 hours. In a preferred embodiment, the reaction mixture is stirred for 1 hour.

At step 56, the method 50 includes filtering and washing the gel-like precipitate with distilled water to form a washed precipitate. In some embodiments, the gel-like precipitate can be washed with but is not limited to, deionized water, ethanol, isopropanol, acetone, methanol, hexane, toluene, chloroform, acetone-water mixture, ethanol-water mixture, butanol, diethyl ether, tetrahydrofuran, acetonitrile, dimethyl sulfoxide, water-acetone mixture, saline solution, sodium chloride solution, potassium chloride solution, hydrochloric acid solution, sodium bicarbonate solution, sodium hydroxide solution, phosphoric acid solution, sodium phosphate solution, hydrochloric acid-ethanol solution, acetone-ethanol solution, or a mixture of organic solvents like acetone-toluene or ethanol-isopropanol. In a preferred embodiment, the gel-like precipitate is washed with distilled water.

At step 58, the method 50 includes drying the washed precipitate at 80 to 120° C., preferably 100° C. to form a dried precipitate. In some embodiments, the washed precipitate is dried with but is not limited to, hot air, oven drying, vacuum drying, freeze-drying, air-drying, desiccator drying, rotary evaporator, infrared drying, microwave drying, thermal drying, nitrogen gas flow, silica gel, phosphorus pentoxide, molecular sieves, calcium chloride, activated alumina, superheated steam, forced air, low-temperature drying, freeze-drying under vacuum, ultrasonic drying, convective drying, and dehumidified air.

At step 60, the method 50 includes calcining the dried precipitate at a temperature in a range from 600 to 800° C. for 1 to 5 hours, preferably 2 to 4 h to form the amorphous silica/cubic $Co_3O_4$/cubic NiO/C nanocomposite material. In some embodiments, the dried precipitate is calcined at a temperature in a range from 600 to 800° C., preferably 650 to 800° C., preferably 700 to 800° C., preferably 750 to 800° C., preferably 650 to 750° C. In a preferred embodiment, the dried precipitate is calcined at 700° C. In some embodiments, the dried precipitate is calcined for 2 to 4 hours, preferably 2.5 to 4 hours, preferably 3 to 4 hours, preferably 3.5 to 4 hours. In a preferred embodiment, the dried precipitate is calcined for 3 hours.

The following examples are provided solely for illustration and are not to be construed as limitations of the present disclosure, as many variations thereof are possible without departing from the spirit and scope of the present disclosure.

EXAMPLES

The following examples demonstrate an amorphous silica/cubic $Co_3O_4$/cubic NiO/C nanocomposite material as described herein. The examples are provided solely for illustration and are not to be construed as limitations of the present disclosure, as many variations thereof are possible without departing from the spirit and scope of the present disclosure.

Figure 1B:
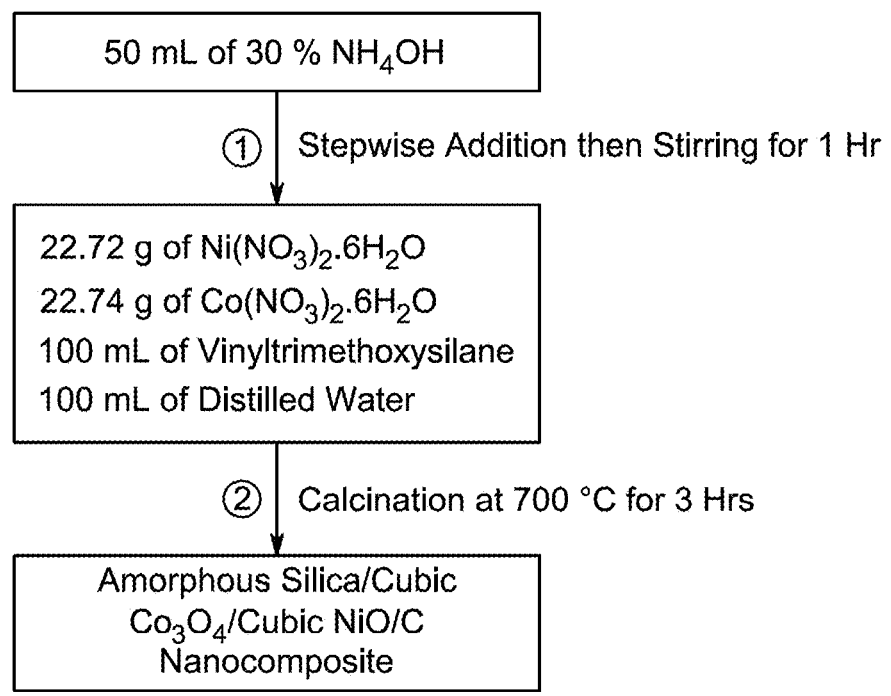
FIG. 1B depicts an experimental step to produce the nanocomposite material, according to certain embodiments.

Example 1: Synthesis of Amorphous Silica/Cubic (Cobalt Oxide) ($Co_3O_4$)/Cubic Nickel Oxide (NiO)/C Nanocomposite (Nanocomposite Material) Using Sol-Gel Method The synthesis of the amorphous silica/cubic $Co_3O_4$/cubic NiO/C nanocomposite material was achieved via the sol-gel method, as illustrated in FIG. 1B. Initially, 22.72 g of nickel (II) nitrate hexahydrate ($Ni(NO_3)_2 \cdot 6H_2O$), 22.74 g of cobalt (II) nitrate hexahydrate ($Co(NO_3)_2 \cdot 6H_2O$), and 100 mL of vinyltrimethoxysilane were dissolved in 100 mL of distilled water. Subsequently, 50 mL of 30% ammonium hydroxide ($NH_4OH$) was added dropwise to the mixture under continuous stirring for one hour to facilitate the gelation process. The resultant product was filtered, washed thoroughly with distilled water, and dried at 100° C. Finally, the dried material was calcined at 700° C. for three hours to obtain the amorphous silica/cubic $Co_3O_4$/cubic NiO/C nanocomposite material.

Figure 2:
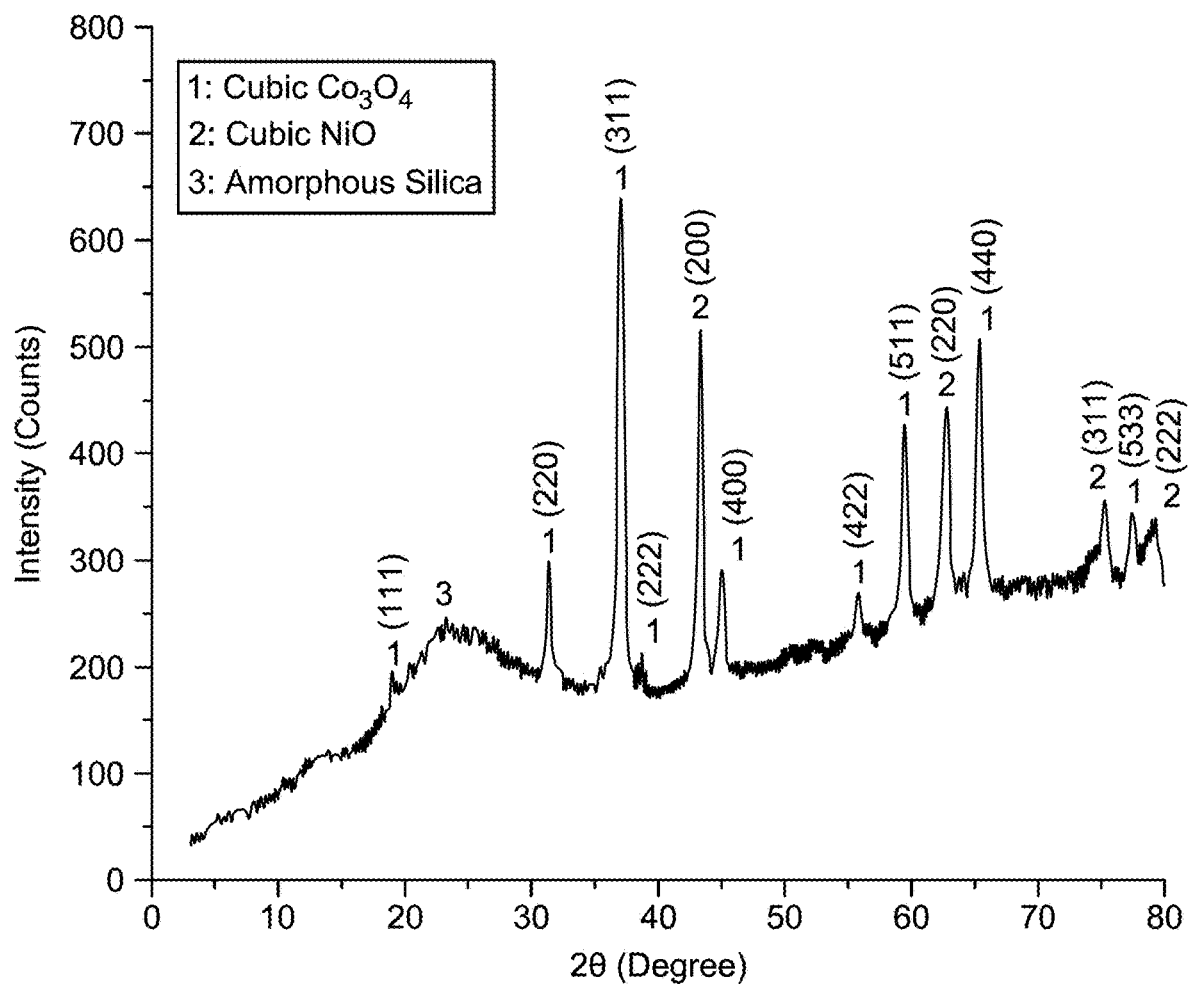
FIG. 2 depicts an X-ray diffraction (XRD) pattern of the nanocomposite material, according to certain embodiments.

FIG. 2 shows the X-ray diffraction (XRD) pattern of the nanocomposite material, and the structural and crystallographic properties of its components are summarized in Table 1. The nanocomposite material consists of amorphous silica, cobalt oxide ($Co_3O_4$), and nickel oxide (NiO). Amorphous silica exhibits a broad diffraction band at $2\theta=23.07$, indicating its amorphous nature. $Co_3O_4$, identified by card number JCPDS-00-009-0418, crystallizes in a cubic crystal system with prominent diffraction peaks observed at $2\theta$ values of 19.09, 31.37, 36.94, 38.50, 44.91, 55.61, 59.39, 65.37, and 77.43, corresponding to the (111), (220), (311), (222), (400), (422), (511), (440), and (533) planes, respectively. NiO, identified by card number JCPDS-01-086-8924, crystallizes in a cubic crystal system with diffraction peaks at $2\theta$ values of 43.12, 62.64, 75.13, and 79.02, corresponding to the (200), (220), (311), and (222) planes, respectively. The average crystallite size of the nanocomposite material is 57.30 nm.

TABLE 1

Structural and crystallographic properties of the synthesized nanocomposite components, as determined by XRD.

| Components of synthesized nanocomposite | | | | Average crystallite size of the nanocomposite material (nm) |
|---|---|---|---|---|
| Phase | Chemical name | Card No. | Crystal system | |
| Amorphous silica | Amorphous silica | | | 57.3 |
| $Co_3O_4$ | Cobalt oxide | JCPDS-00-009-0418 | Cubic | |
| NiO | Nickel oxide | JCPDS-01-086-8924 | cubic | |

Figure 3:
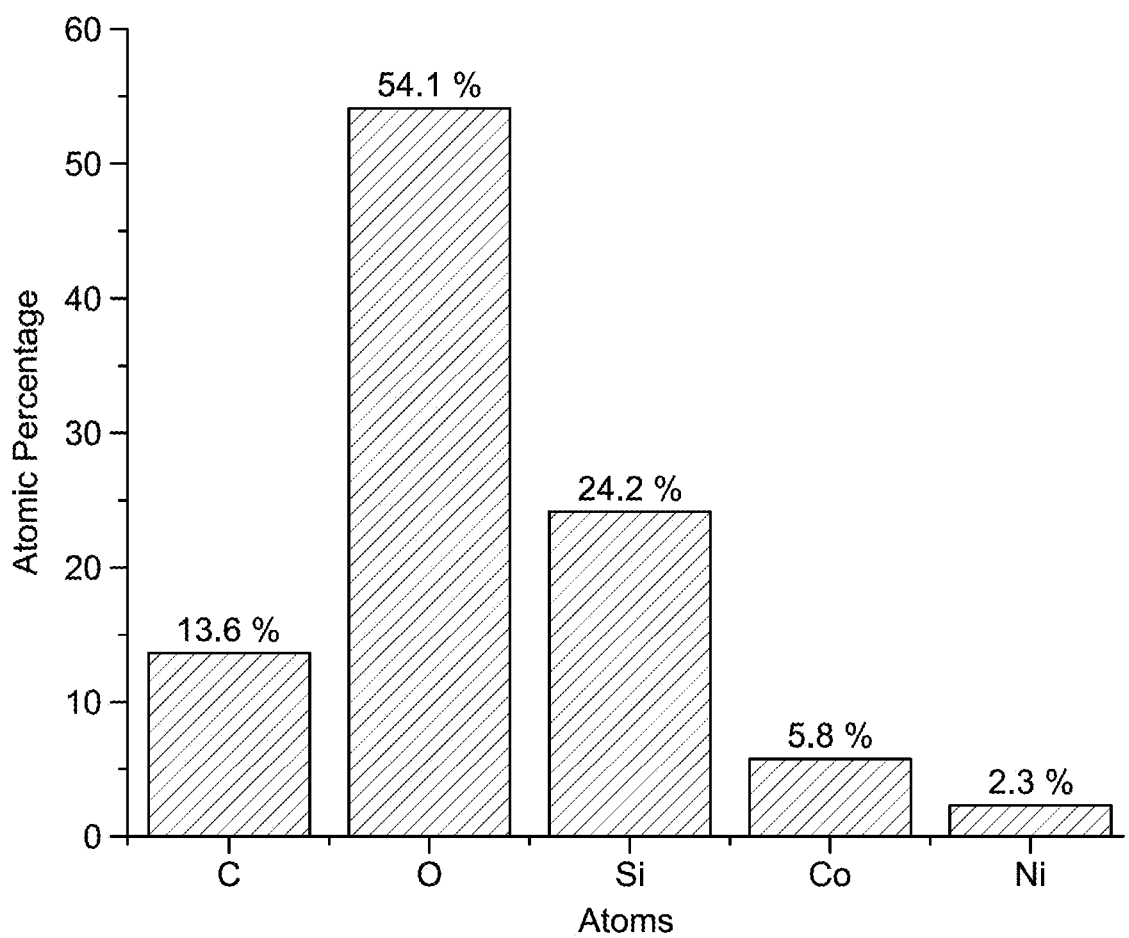
FIG. 3 depicts a distribution of atomic percentages of elements in the nanocomposite material as determined by energy dispersive X-ray spectroscopy (EDX), according to certain embodiments.

FIG. 3 presents the distribution of atomic percentages of elements in the nanocomposite material as determined by energy dispersive X-ray spectroscopy (EDX). The elemental composition indicates the presence of carbon, oxygen, silicon, cobalt, and nickel, with atomic percentages of 13.6%, 54.1%, 24.2%, 5.8%, and 2.3%, respectively. The high percentage of oxygen and silicon confirms the successful incorporation of amorphous silica into the nanocomposite. The carbon detected in the nanocomposite is attributed to the decomposition of vinyltrimethoxysilane used during the sol-gel synthesis process, which contributes carbonaceous material to the final product. The relatively lower percentages of cobalt and nickel are consistent with the stoichiometric ratios used in the preparation of the $Co_3O_4$ and NiO phases within the composite structure. The compositional analysis further supports the successful synthesis of the amorphous silica/cubic $Co_3O_4$/cubic NiO/C nanocomposite material.

Figure 4:
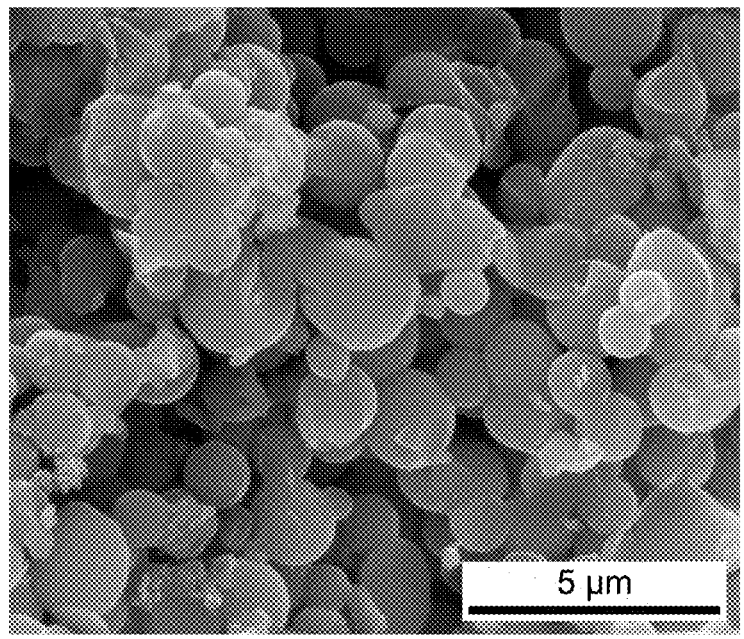
FIG. 4 depicts a scanning electron microscope (SEM) image of the nanocomposite material, according to certain embodiments.

FIG. 4 displays the scanning electron microscope (SEM) image of the nanocomposite material, revealing its morphological features. The SEM image illustrates a dense agglomeration of spherical and semi-spherical particles, which are characteristic of the nanocomposite material. The spherical morphology reflects the uniformity and homogeneity achieved during the sol-gel synthesis process. The average grain size of the nanocomposite, calculated based on the SEM image, is 1.46 μm, indicating the effective control of particle size during synthesis. The microstructural analysis confirms the successful fabrication of the amorphous silica/cubic $Co_3O_4$/cubic NiO/C nanocomposite material with well-defined morphological characteristics.

Figure 5:
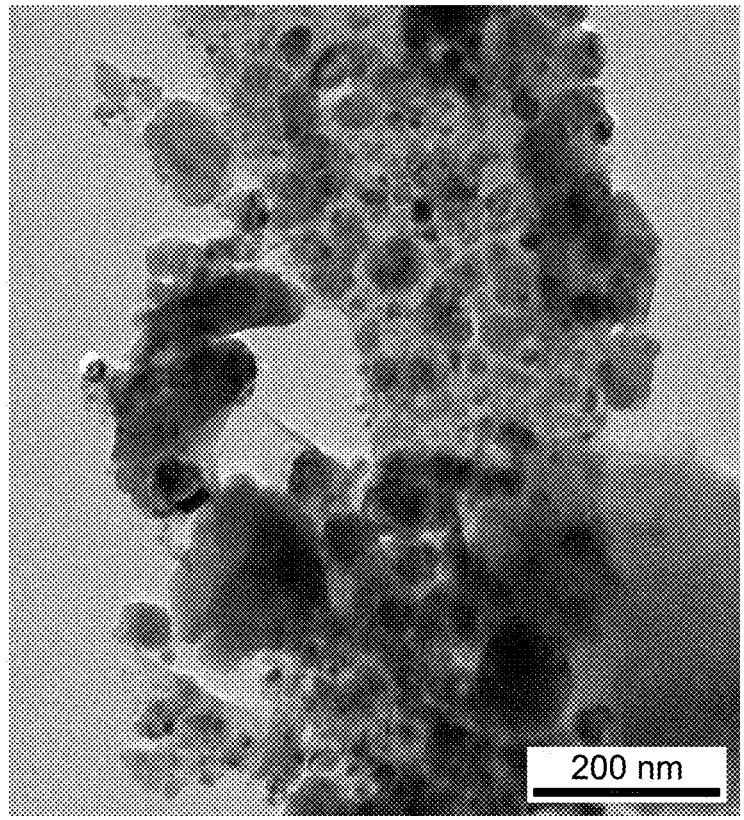
FIG. 5 depicts a high-resolution transmission electron microscopy (HRTEM) image of the nanocomposite material, according to certain embodiments.

FIG. 5 presents the high-resolution transmission electron microscopy (HRTEM) image of the nanocomposite material, showcasing its detailed structural features at the nanoscale. The transmission electron microscopy (TEM) image reveals spherical and irregularly shaped particles with clear agglomeration, reflecting the morphology of the nanocomposite material. The particles appear well-defined, indicating the high crystallinity and uniform distribution of the composite components. The average particle diameter, calculated from the TEM analysis, is 59.04 nm, highlighting the nanoscale dimensions achieved during the synthesis process.

Adsorption of Ciprofloxacin (CIP)

0.05 g of sorbent was measured in a separate 150 mL beaker. 100 mL of the 100 milligram per liter (mg $L^{-1}$) CIP solution was poured into each beaker. A portion of the mixture was withdrawn till the CIP sorption reached equilibrium. The aliquots were filtered via a 0.22 μm syringe filter, and the absorbance was measured utilizing a UV-Vis-spectrophotometer.

The contact time study of CIP and sorption onto the as-prepared nanocomposite was studied. The CIP and absorbance measured during the study were employed for calculating the remaining concentrations (unabsorbed) at each time interval via Eq. 1. Using Eq. 2 was utilized to calculate the adsorption capacity at each period [$q_t$, milligram per gram (mg $g^{-1}$)].

$$C_t = \frac{Absorbance_{sample}}{Absorbance_{standard}} \times conc._{standard} \quad (1)$$

$$q_t = \frac{(C_o - C_t)V}{m} \quad (2)$$

Figure 6:
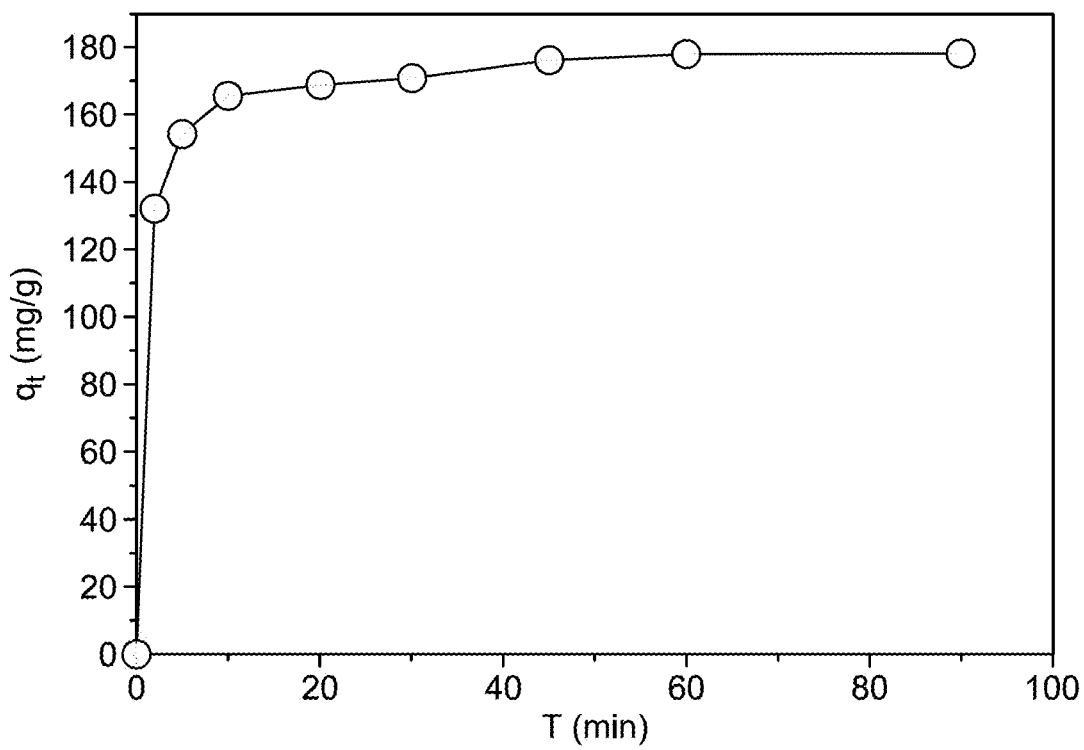
FIG. 6 depicts contact time investigation of ciprofloxacin (CIP) sorption onto $Co_3O_4$/NiO/C@$SiO_2$ nanocomposite, according to certain embodiments.

FIG. 6 demonstrates the adsorption trend of CIP onto the nanocomposite material. The $Co_3O_4$/NiO/C@$SiO_2$ showed $q_t$ values of 178.1; the results reflected the high sorption ability of the $Co_3O_4$/NiO/C@$SiO_2$. Notably, almost 90% of the gained $q_t$ value was acquired within the first 30 minutes, and the overall sorption processes reached equilibrium within 60 minutes, presenting the $Co_3O_4$/NiO/C@$SiO_2$ as fast treatment sorbent.

Adsorption Rate Order

The adsorption rate order of CIP removal by $Co_3O_4$/NiO/C@$SiO_2$ was studied via pseudo-first order (PF, Eq. 3) and pseudo-second order (PS, Eq. 4) kinetic models.

$$\ln(q_e - q_t) = \ln q_e - k_1 \cdot t \quad (3)$$

$$\frac{1}{q_t} = \frac{1}{k_2 \cdot q_e^2 t} + \frac{1}{q_e} \quad (4)$$

Figure 7:
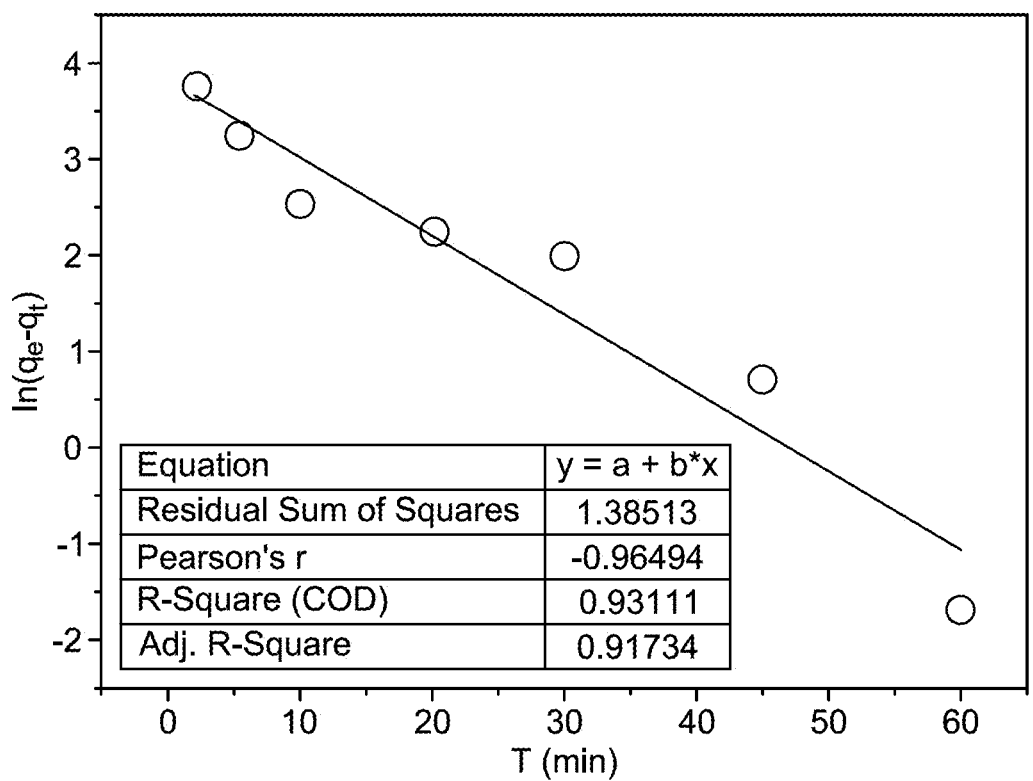
FIG. 7 depicts pseudo first order (PF) investigation of CIP sorption onto the nanocomposite material, according to certain embodiments.
Figure 8:
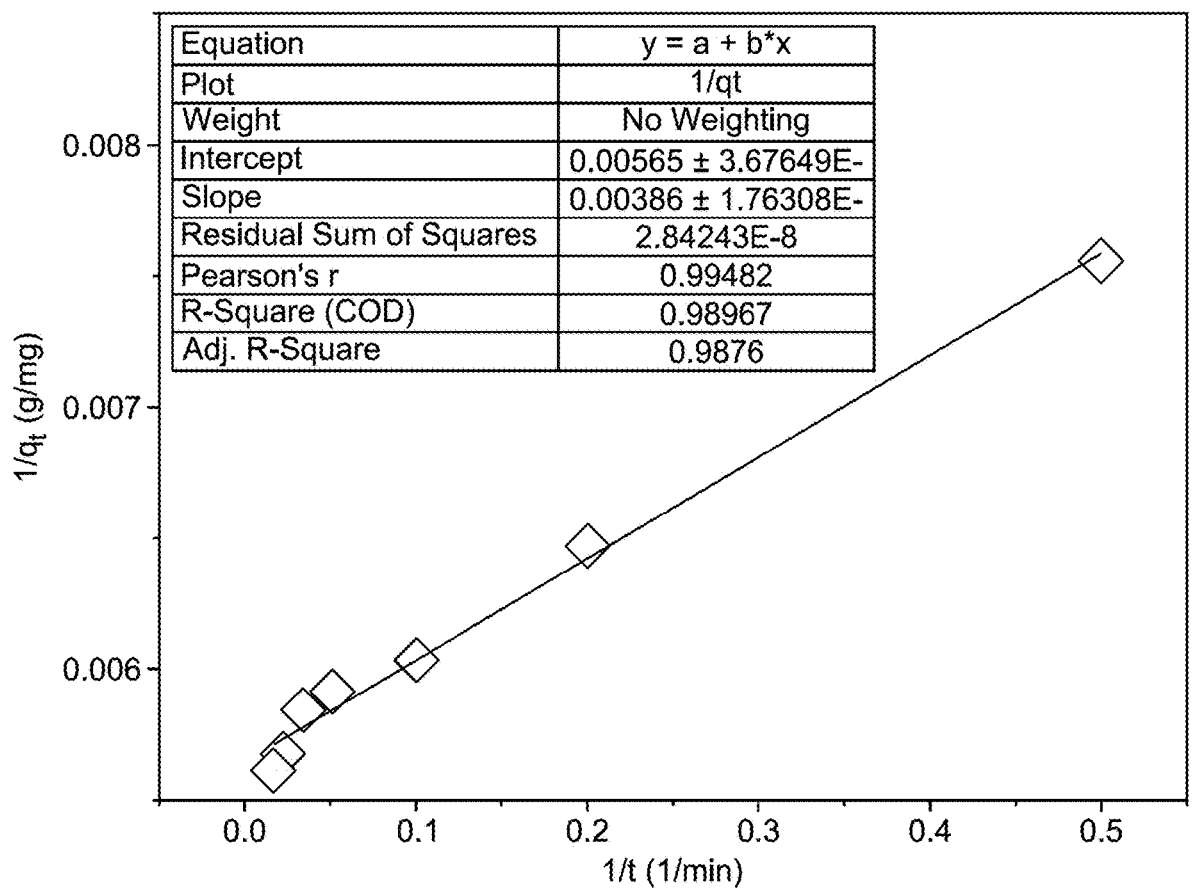
FIG. 8 depicts pseudo second order (PS) investigation of CIP sorption onto the nanocomposite material, according to certain embodiments.

The symbol qe (mg/g) represents the equilibrium adsorption capacity. The pseudo-first order (PF) and pseudo-second order (PS) constants are time-dependent, with the former represented as k1 ($min^{-1}$) and the latter as k2 gram per milligram per minute (g $mg^{-1}$ $min^{-1}$). The PF plot of the CIP adsorption onto $Co_3O_4$/NiO/C@$SiO_2$ nanocomposite is depicted in FIG. 7. Additionally, FIG. 8 illustrates the PS plots of CIP sorption onto $Co_3O_4$/NiO/C@$SiO_2$. The rate-order output of CIP removal, as shown in Table 2, illustrated that the sorption on $Co_3O_4$/NiO/C@$SiO_2$ showed better fitting to the PS model.

TABLE 2

The adsorption rate order and rate control results of CIP removal by the $Co_3O_4$/NiO/C@$SiO_2$.

| Sorption rate order | PF | | PS | |
|---|---|---|---|---|
| qe exp. (mg g-1) | $R^2$ | $k_1$ | $R^2$ | $k_2$ |
| 158.11 | 0.9321 | 0.0758 | 0.994 | 0.00299 |
| Sorption rate control | LFD | | IPD | |
| mechanism | $K_{LF}$ ($min^{-1}$) | $R^2$ | $K_{IP}$ (mg $g^{-1}$ $min^{0.5}$) | $R^2$ |
| | 0.076 | 0.93 | 11.026 | 0.78 |

Adsorption Control Mechanism

The rate-control mechanism of CIP removal by $Co_3O_4$/NiO/C@$SiO_2$ was studied using the intraparticle (IPD, Eq. 5) and the liquid-film (LFD, Eq. 6) diffusion model.

$$q_t = K_{IP} * t^{\frac{1}{2}} + C_i \quad (5)$$

$$\ln(1 - F) = -K_{LF} * t \quad (6)$$

The IPD constant is denoted by $K_{IPD}$ (mg $g^{-1}$ $min^{-1/2}$), and the LFD constant is designated by $K_{LFD}$ ($min^{-1}$). $C_i$: the boundary layer factor, expressed as mg $g^{-1}$.

Figure 9:
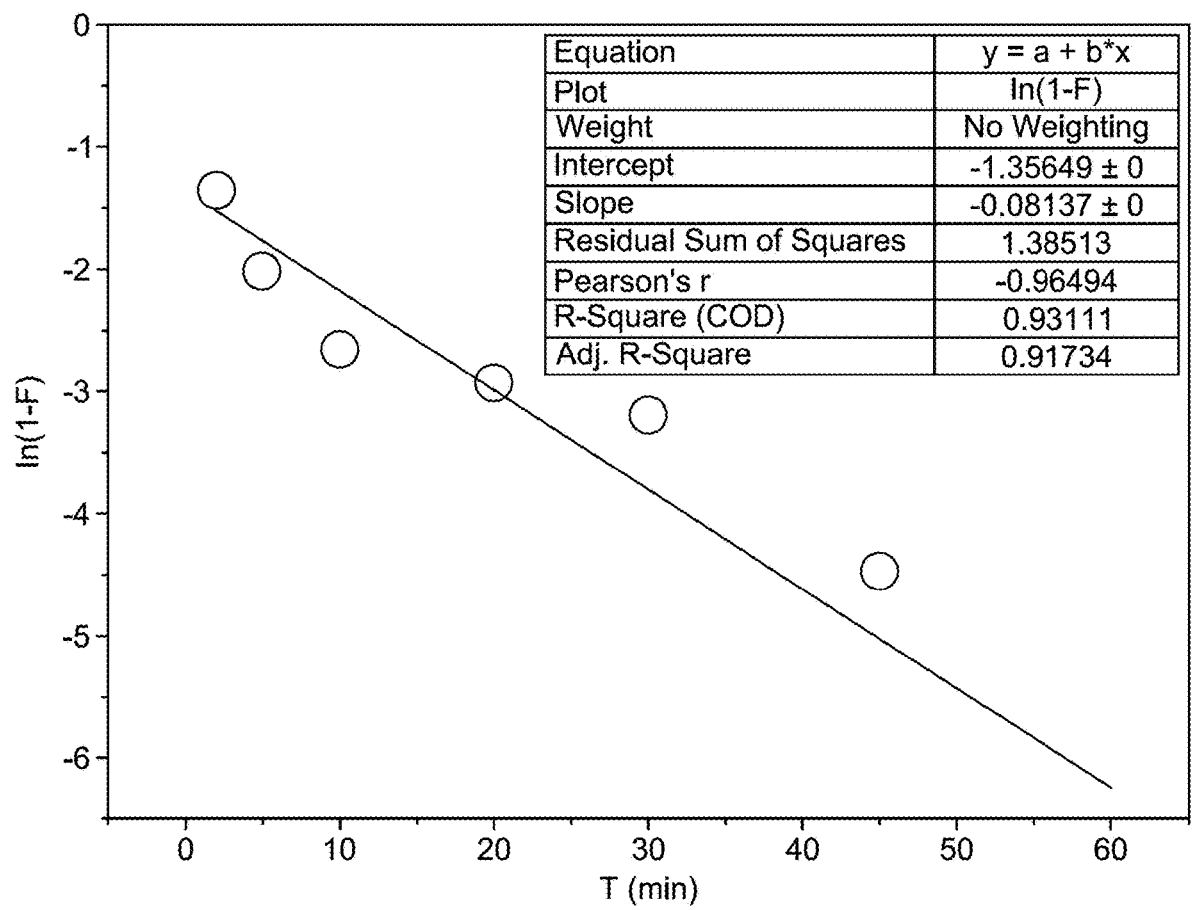
FIG. 9 depicts (liquid film) LFD investigation of CIP sorption onto the nanocomposite material, according to certain embodiments.
Figure 10:
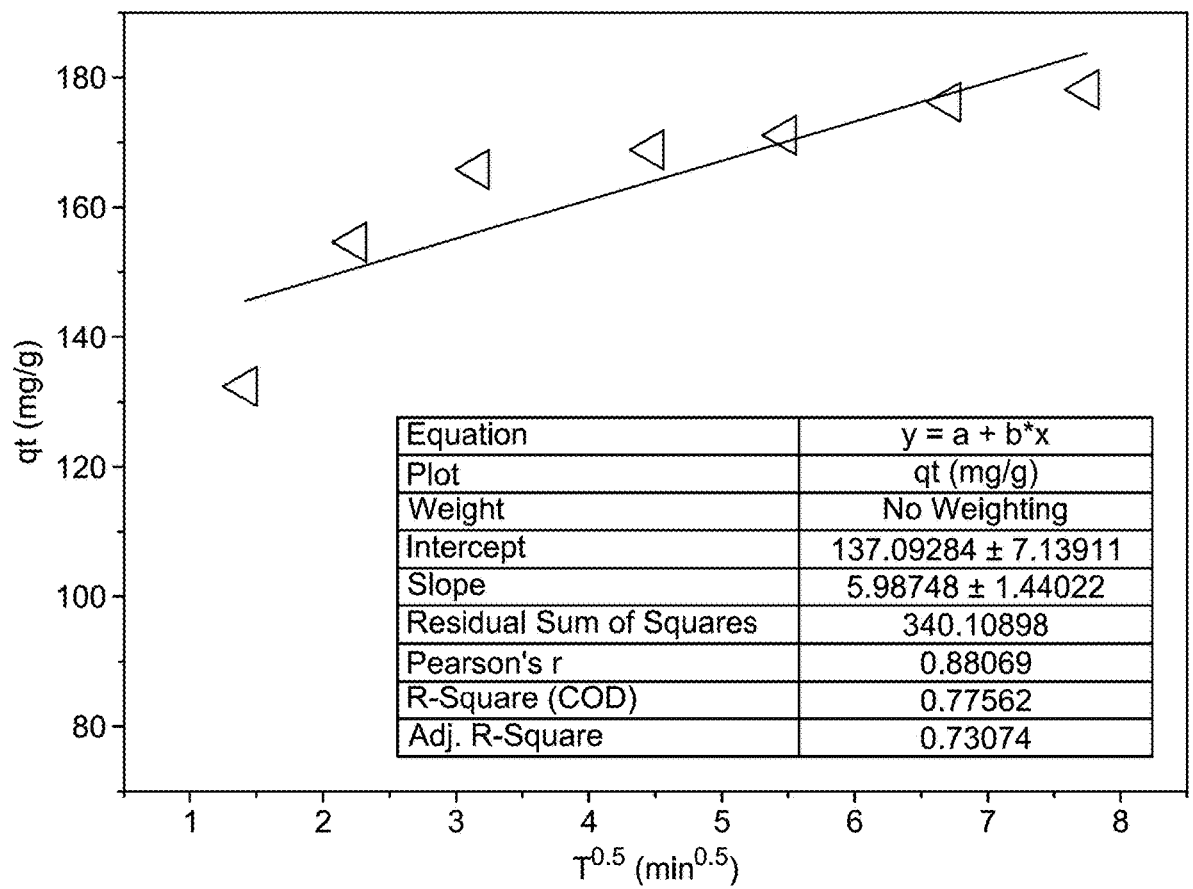
FIG. 10 depicts (intraparticle) IPD investigation of CIP sorption onto the nanocomposite material, according to certain embodiments.

The LFD plot of the CIP adsorption onto $Co_3O_4$/NiO/C@$SiO_2$ nanocomposite was depicted in FIG. 9. Additionally, FIG. 10 illustrated the IPD plots of CIP sorption onto $Co_3O_4$/NiO/C@$SiO_2$. The rate-control output of CIP removal, as shown in Table 2, illustrated that the LF controlled the sorption on $Co_3O_4$/NiO/C@$SiO_2$, IPD constant is denoted by $K_{IPD}$ (mg $g^{-1}$ $min^{-1/2}$), and the LFD constant is designated by $K_{LFD}$ ($min^{-1}$). $C_i$: the boundary layer factor, expressed as milligram per gram (mg $g^{-1}$).

Commercial Applications

The amorphous silica/cubic $Co_3O_4$/cubic NiO/C nanocomposite material holds potential for commercial applications in advanced catalysis, offering enhanced efficiency in chemical reactions due to its uniform morphology. The distinct composition and structural integrity make it a valuable material for energy storage devices, such as batteries and supercapacitors, by improving charge storage capacity and cycling stability. Additionally, the multifunctionality and environmental compatibility of the material position it as an excellent candidate for water purification technologies, enabling the removal of contaminants through adsorption or catalytic degradation processes.

In the present disclosure, amorphous silica/cubic $Co_3O_4$/cubic NiO/C nanocomposite material was synthesized using a sol-gel method that combines amorphous silica with cubic phases of cobalt oxide and nickel oxide in a carbon matrix. The synthesis process of the nanocomposite includes the use of nickel nitrate, cobalt nitrate, and vinyltrimethoxysilane in an aqueous solution, followed by gelation using ammonium hydroxide, drying, and calcination at 700° C. for 3 hours. The nanocomposite has an average crystallite size is 57.30 nm as determined by XRD analysis. Further, the morphology consists of spherical and semi-spherical particles with an average grain size of 1.46 μm, as observed by SEM. Still further, the nanoscale structure includes spherical and irregularly shaped particles with an average particle diameter of 59.04 nm, as determined by HRTEM. Furthermore, the elemental composition includes 13.6% carbon, 54.1% oxygen, 24.2% silicon, 5.8% cobalt, and 2.3% nickel, as analyzed by EDX. In the present disclosure, the use of vinyltrimethoxysilane as a precursor in the sol-gel process is introduced as carbon matrix within the nanocomposite to enhance the structural stability and functionality. The unique integration of amorphous silica, cubic $Co_3O_4$, and cubic NiO phases enables enhanced multifunctionality for applications in catalysis, energy storage, and environmental remediation. Further, the synthesis method of the nanocomposite is scalable, environmentally friendly, and capable of producing consistent and high-quality nanocomposites with tailored properties.

Numerous modifications and variations of the present disclosure are possible considering the above teachings. It is therefore to be understood that within the scope of the appended claims, the disclosure may be practiced otherwise than as specifically described herein.

The invention claimed is:

1. An amorphous silica/cubic $Co_3O_4$/cubic NiO/C nanocomposite material, comprising:
an amorphous $SiO_2$ phase;
a cubic $Co_3O_4$ phase; and
a cubic NiO phase,
wherein the amorphous silica/cubic $Co_3O_4$/cubic NiO/C nanocomposite material has a granular morphology with an average grain size in a range from 0.5 to 2.5 μm,
wherein the granular morphology comprises nanoscale particles aggregated into the granular morphology,
wherein the nanoscale particles have an average particle diameter in a range from 30 to 90 nm, and
wherein the amorphous silica/cubic $Co_3O_4$/cubic NiO/C nanocomposite material has an adsorption capacity for ciprofloxacin of greater than or equal to 170 mg/g.

2. The amorphous silica/cubic $Co_3O_4$/cubic NiO/C nanocomposite material of claim 1, wherein the average grain size is in a range from 1 to 2 μm.

3. The amorphous silica/cubic $Co_3O_4$/cubic NiO/C nanocomposite material of claim 2, wherein the average grain size is in a range from 1.3 to 1.6 μm.

4. The amorphous silica/cubic $Co_3O_4$/cubic NiO/C nanocomposite material of claim 1, wherein the nanoscale particles have an average particle diameter in a range from 40 to 80 nm.

5. The amorphous silica/cubic $Co_3O_4$/cubic NiO/C nanocomposite material of claim 4, wherein the nanoscale particles have an average particle diameter in a range from 55 to 65 nm.

6. The amorphous silica/cubic $Co_3O_4$/cubic NiO/C of claim 1, wherein the oxygen content is in a range from 40 to 70 atomic % (at. %), the silicon content is in a range from 15 to 35 at. %, the cobalt content is in a range from 0.25 to 15 at. %, the nickel content is in a range from 0.25 to 10 at. %, and the carbon content is in a range from 4 to 25 at. % wherein at. % is based on the total number of atoms in the amorphous silica/cubic $Co_3O_4$/cubic NiO/C nanocomposite material.

7. The amorphous silica/cubic $Co_3O_4$/cubic NiO/C of claim 6, wherein the oxygen content is in a range from 45 to 65 atomic % (at. %), the silicon content is in a range from 20 to 30 at. %, the cobalt content is in a range from 0.5 to 10 at. %, the nickel content is in a range from 0.5 to 5 at. %, and the carbon content is in a range from 8 to 20 at. % wherein at. % is based on the total number of atoms in the amorphous silica/cubic $Co_3O_4$/cubic NiO/C nanocomposite material.

8. The amorphous silica/cubic $Co_3O_4$/cubic NiO/C of claim 7, wherein the oxygen content is in a range from 50 to 60 atomic % (at. %), the silicon content is in a range from 22 to 26 at. %, the cobalt content is in a range from 3 to 7.5 at. %, the nickel content is in a range from 1 to 3.5 at. %, and the carbon content is in a range from 10 to 17 at. % wherein at. % is based on the total number of atoms in the amorphous silica/cubic $Co_3O_4$/cubic NiO/C nanocomposite material.

9. The amorphous silica/cubic $Co_3O_4$/cubic NiO/C nanocomposite material of claim 1, wherein the average crystallite size is in a range from 50 to 70 nm.

10. The amorphous silica/cubic $Co_3O_4$/cubic NiO/C nanocomposite material of claim 1, wherein the average crystallite size is in a range from 52 to 65 nm.

11. The amorphous silica/cubic $Co_3O_4$/cubic NiO/C nanocomposite material of claim 1, wherein the average crystallite size is in a range from 55 to 60 nm.

12. A method of producing the amorphous silica/cubic $Co_3O_4$/cubic NiO/C nanocomposite material of claim 1, comprising:
adding $NH_4OH$ dropwise to a solution comprising $Ni(NO_3)_2 \cdot 6H_2O$, $Co(NO_3)_2 \cdot 6H_2O$, and vinyltrimethoxysilane, forming a reaction mixture;
stirring the reaction mixture for 1 h, forming a gel-like precipitate;
filtering and washing the gel-like precipitate with distilled water to form a washed precipitate;
drying the washed precipitate at 100° C. to form a dried precipitate; and
calcining the dried precipitate at a temperature in a range from 600 to 800° C. for 1 to 5 hr to form the amorphous silica/cubic $Co_3O_4$/cubic NiO/C nanocomposite material.

13. The method of claim 12, wherein the concentration of $NH_4OH$ in the reaction mixture is in a range from 50 to 70 ml/L.

14. The method of claim 12, wherein the concentration of $Ni(NO_3)_2 \cdot 6H_2O$ in the reaction mixture is in a range from 80 to 100 g/L.

15. The method of claim 12, wherein the concentration of $Co(NO_3)_2 \cdot 6H_2O$ in the reaction mixture is in a range from 80 to 100 g/L.

16. The method of claim 12, wherein the concentration of vinyltrimethoxysilane in the reaction mixture is in a range from 300 to 500 ml/L.

17. The method of claim 12, wherein the dried precipitate is calcined at 650 to 750° C.

18. The method of claim 17, wherein the dried precipitate is calcined at 700° C.

19. The method of claim 12, wherein the dried precipitate is calcined for 2 to 4 hours.

20. The method of claim 19, wherein the dried precipitate is calcined for 3 hours.

* * * * *